(12) United States Patent
Zhi et al.

(10) Patent No.: US 12,455,804 B2
(45) Date of Patent: Oct. 28, 2025

(54) LOW-COST AND ZERO-SHOT ONLINE LOG PARSING METHOD BASED ON LARGE LANGUAGE MODEL

(71) Applicant: ZHEJIANG UNIVERSITY, Zhejiang (CN)

(72) Inventors: Chen Zhi, Hangzhou (CN); Liye Cheng, Hangzhou (CN); Meilin Liu, Hangzhou (CN); Xuhong Zhang, Hangzhou (CN); Xinkui Zhao, Hangzhou (CN); Shuiguang Deng, Hangzhou (CN); Jianwei Yin, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/857,168

(22) PCT Filed: Mar. 26, 2024

(86) PCT No.: PCT/CN2024/083762
§ 371 (c)(1),
(2) Date: Oct. 15, 2024

(87) PCT Pub. No.: WO2025/077116
PCT Pub. Date: Apr. 17, 2025

(65) Prior Publication Data
US 2025/0117307 A1 Apr. 10, 2025

(51) Int. Cl.
*G06F 17/00* (2019.01)
*G06F 11/34* (2006.01)
(Continued)

(52) U.S. Cl.
CPC ........ *G06F 11/3476* (2013.01); *G06F 40/186* (2020.01); *G06F 40/205* (2020.01); *G06F 40/30* (2020.01)

(58) Field of Classification Search
None
See application file for complete search history.

(56) References Cited

U.S. PATENT DOCUMENTS 11,030,556 B1 * 6/2021 Mann ............ G06Q 10/063114
11,244,266 B2 * 2/2022 Fukami ............ G06Q 10/06316
(Continued)

FOREIGN PATENT DOCUMENTS

CN 111538639 8/2020
CN 116341513 6/2023

*Primary Examiner* — Satwant K Singh
(74) *Attorney, Agent, or Firm* — Jiwen Chen; Joywin IP Law PLLC

(57) ABSTRACT

Disclosed in the present disclosure is a low-cost and zero-shot online log parsing method based on a large language model, including: firstly, extracting content of a log in a log message using regular expressions, then, performing regular expression matching with a log template in a database; if the matching is successful, updating a log sample corresponding to the log template; if the matching fails, conducting a dialogue with the large language model to obtain a new log template; performing template correction to prevent the log template generated by the large language model from being incapable of performing regular expression matching with the log message; performing template merging when a new template is generated; performing template splitting when the log sample is updated; and for all log templates to be added to the database, firstly, normalizing the log templates by post-processing, and then storing the log templates to the database. The log template generated by the present disclosure outperforms conventional methods in terms of word parsing accuracy, with significant advantages in speed and cost compared with the direct use of the large language model to perform log parsing tasks.

8 Claims, 6 Drawing Sheets

(51) Int. Cl.
    *G06F 40/186*    (2020.01)
    *G06F 40/205*    (2020.01)
    *G06F 40/30*    (2020.01)

(56) References Cited

U.S. PATENT DOCUMENTS

| | | | |
|---|---|---|---|
| 11,307,753 B2* | 4/2022 | Haramati | G06F 21/6227 |
| 11,630,719 B1* | 4/2023 | Kottapalli | G06F 11/079 |
| | | | 714/47.3 |
| 11,734,320 B2* | 8/2023 | Huang | G06F 16/335 |
| | | | 704/9 |
| 2021/0166196 A1* | 6/2021 | Lereya | G06Q 10/0633 |
| 2021/0166339 A1* | 6/2021 | Mann | G06Q 10/063114 |
| 2022/0308952 A1* | 9/2022 | Ni | G06F 40/30 |
| 2024/0241886 A1* | 7/2024 | Suto | G06F 11/34 |

\* cited by examiner

LOW-COST AND ZERO-SHOT ONLINE LOG PARSING METHOD BASED ON LARGE LANGUAGE MODEL

FIELD OF TECHNOLOGY

The present invention relates to the field of log template extraction in software engineering, in particular to a low-cost- and zero-shot online log parsing method based on a large language model.

BACKGROUND OF TECHNOLOGY

As large software systems become larger and more complex, it becomes important to use observability tools to observe various components of the software system to ensure reliability and maintainability of the system. Among the information such as indicators, log information and link tracking, log information contains more semantic information about errors, which plays a significant role in the prediction and location of anomalies in the system.

Generally, when performing maintenance monitoring on a software system, we collect logs of various components and parse these logs to obtain a log template and a dynamic variable, where the log template is generally a fixed part of a statement for printing a log, and the dynamic variable is what is printed to be different according to different situations and different problems of different components. The most direct traditional log parsing method performs pattern matching relying on some regular expressions set by experts, but this method relies too much on expert knowledge and experience, and has poor robustness. Therefore, there are many grammar-based log parsing methods, including frequent pattern mining-based methods, similarity clustering-based methods and heuristic-based methods. Some semantic mining-based methods have also emerged in recent years.

Methods based on frequent pattern mining, such as Logram, Log File Abstraction (LFA), Simple Logfile Clustering Tool (SLCT), etc. Based on the point of view that the frequency of static variables in the log should be much higher than that of dynamic variables, the frequent patterns appearing in the whole log data set are searched as the log template.

Methods based on similarity clustering, such as Log Key Extraction (LKE), Length Matters Clustering (LenMa), etc. Based on the view that the log information belonging to the same log template should contain more common parts, various clustering methods are used to group similar logs, and the logs under the same group are considered to belong to the same template, and the frequently occurring variables in the logs of the same group are extracted as the log template.

Heuristic-based methods, such as Drain, Abstracting Execution Logs (AEL), Brain, etc., utilize feature extraction templates on the unique grammar of log messages.

Semantic-based methods such as Semparser, Uniparser, Log Parser with Prompt-based Few-shot Learning (LogPPT) etc. Data-driven log parsing methods focus more on log grammatical information, log template extraction based on statistical word frequency and word position information. In recent years, the methods based on log semantic mining pay more attention to the semantic of log statements, using deep learning methods to train the model or fine-tuning pre-training language model to extract the semantic information of words in the log, determining whether a word should belong to static variables or dynamic variables, and completing the log parsing. It should be noted that the log parsing task using the large language model is also a semantic-based method because the large language model uses rich corpus information in the training phase.

However, these Methods have the Following Unsolved Technical Problems:

1. The grammar-based log parsing method can achieve a good effect on log grouping, i.e., according to the grammatical information of a log, log messages belonging to the same log template can be divided into one group in large probability. However, as semantic information is not utilized, grammar-based methods do not perform well for which words should become wildcards as variables and which should be reserved in the log template as constants, resulting in less performance than semantic-based methods in terms of some measure of parsing accuracy, such as word parsing accuracy, edit distance.

2. Semantic-based methods are usually based on deep learning, through some labeled data for training, better results can be generally achieved when processing logs generated by the same data source. However, there is no guarantee that there are labeled data for model training. For processing online log parsing scenarios, scenarios in which multiple log sources or log statements frequently fluctuate are currently unsuitable for semantic-based methods.

3. The existing log parsing methods based on conversational large language model are unreliable and expensive. On the one hand, because of the illusion of large language model, it may lead to the increase or lack of information of the original log template, resulting in the failure of regular expression matching. Even if regular expression matching is possible, the log templates generated by large language models are too restrictive and too permissive. Moreover, the time and money costs of invoking large language models are not necessarily superior to conventional methods.

SUMMARY OF THE INVENTION

The present invention provides a low-cost and zero-shot online log parsing method based on a large language model, which can obtain the semantic information of a log according to the parsing of the large language model, obtain the grammatical information of the log according to the longest common subsequence (LCS) among logs, and combine the two kinds of information to obtain a more accurate log template. By correcting the log template, the log template is capable of performing regular expression matching with the log e, so the database can be used to store the log template for subsequent matching, which greatly reduces the invoking times of large language models.

A low-cost and zero-shot online log parsing method based on a large language model, which includes the following steps:

S1: pre-processing firstly, the content part of the log needing to be extracted, and the format of the log of the same log source being fixed; using different regular expressions to extract content of a log for different log sources, then, using a pre-defined rule to replace variables in the content of the log with wildcards, and finally, detecting whether the log contains only one word, and if the log contains only one word, directly adding the word to a log template database without parsing by the large language model;

S2: template matching and template parsing firstly, querying the log template database, converting parsed log templates into regular expressions, and performing regular expression matching with new incoming logs; and if the matching is successful, updating log samples corresponding to the log templates, otherwise invoking the large language model to parse the log to generate a new template, S3: template correction for the log template obtained by invoking the interfaces of the large language models, firstly determining whether the template is capable of performing regular expression matching with an original log, and if the template is incapable of performing regular expression matching with the original log, performing correction;

S4: template merging when a new template is generated, finding similar templates through clustering, and when similarity exceeds a set threshold, merging the templates;

S5: template splitting performing frequency analysis on a sample of the log template, and if an occurrence frequency of words at certain positions exceeds a threshold, as a constant part of the template, splitting the template based on the words; and S6: post-processing after the template is obtained, performing post-processing to ensure that the obtained template conforms to the specification, and then storing the template in the database.

Step S1 specifically includes:

S1.1: determining a corresponding log format according to a selected log source, selecting a corresponding regular expression to extract content of the log, and ignoring a log header (such as a date, a time, a log level, a thread id, etc.);

S1.2: replacing special characters in the content of the log; replacing this part of special characters according to relevant specifications (e.g., bracketing the variable with { });

S1.3: replacing the content of the log by rules, and replacing the variables commonly appearing in different log sources using a pre-defined regular expression; for some common variables commonly appearing in different log sources, replacing using a pre-defined regular expression, such as an IP address, a website, etc.; and S1.4: checking the content of the log, and if the processed log template replaced by rules has only one word, using the word as a log template.

Step S2 specifically includes:

S2.1: converting the templates into regular expressions from the log template database storing log templates, then performing matching using the regular expressions to check whether a new incoming log is capable of being matched with a certain log template, if the new incoming log is capable of being matched with the certain log template, updating a log sample, and if the new incoming log is incapable of being matched with the certain log template, proceeding to step S2.2 to perform log parsing; and S2.2: invoking an API (Application Programming Interface) of a conversational large language model, putting the content of the log into the prompt word to put questions to the large language model, and acquiring a log template according to a content of an answer.

Step S3 specifically includes:

S3.1: unifying formats of log template results directly returned by the large language model; for example, placeholders needing to be replaced with a wildcard <*> to use {{ }} placeholder by a large language model to represent variables in a prompt word;

S3.2: obtaining a specified log template in step S3.1, converting the log template into a regular expression, and performing regular expression matching with the log; if the regular expression Matching is successful, directly executing S4, and if the regular expression matching fails, executing S3.3 to correct the template; and S3.3: correcting log templates which are not capable of being subjected to regular expression matching, wherein firstly, both the log and the log template are segmented according to punctuation marks and words; for the two segmented word lists, a common part is found and reserved; for a non-common part, if a wildcard is present in the log template, the word at the position is replaced with the wildcard, otherwise, the word in the original log is used; and recombining the words and the marks after cycling through to obtain a corrected log template.

Step S4 specifically includes:

S4.1: firstly, calculating a distance between a new template and an existing template in the log template database; setting a distance threshold dist, wherein all existing templates with a distance greater than the dist from the new template do not participate in clustering; if the distance between the new template and all the existing templates is greater than the dist, directly adding the new template to the log template database without clustering, otherwise performing a clustering step; and before clustering, calculating a distance matrix among the templates, and then performing template merging on the templates which are clustered into the same class with the new template; and S4.2: firstly, extracting a longest common subsequence (LCS) clustered into the same class of template groups, wherein the LCS is a common part among templates, and is reserved in a merged template; and the part segmented by the LCS is a private part of each of the templates, and for the private part, what is not null is directly replaced with a wildcard to obtain a new merged template.

Step S5 specifically includes:

S5.1 Sampling parsing, by the large language model, the log to obtain a new log template, sampling a log message as a sample by default, storing the log message in a log sample database, and storing the log template in the log template database; if a subsequent incoming new log performs successful regular expression matching with the log template in the database, it is necessary to determine whether to sample the log; for data sets or systems where the amount of data is small, full-scale sampling may be carried out directly. For a scene with a large amount of data, a random sampling method can be used to collect samples in the database;

after sampling a log template, it is necessary determine whether the log sample corresponding to the log template reaches a dynamic threshold N; if the threshold N is not exceeded, directly storing the log message to the log sample database; if the threshold N is exceeded, performing frequency analysis;

if a result of template splitting is a single template (i.e., splitting is unnecessary), the threshold N is increased; if the template splitting is successful, an original template is deleted, and initial threshold setting of the new template is determined according to the number of log samples matched with the template;

S5.2 Frequency analysis firstly, finding a longest common subsequence (LCS) of the sampled log samples as a common part, wherein the part segmented by the common part is a private part of each log sample; counting the number of different substrings of each private part for the private part, wherein a higher frequency of the substrings in the private part indicates that the segment may be a static variable; conversely, a lower frequency means a dynamic variable; and establishing a threshold freq to determine whether the substrings are a static variable or a dynamic variable for all private parts; comparing the highest frequency of different substrings in the private part each time, and if the highest frequency is higher than the freq, determining the private part as a static variable, and splitting a template according to different substrings of the private part, wherein the freq can be set according to an actual scene; and S5.3 Splitting splitting the template according to the word appearing at the private position for position information obtained in the frequency analysis, wherein except for the private position, other parts inherit various parts of the template before splitting; at the same time, log samples corresponding to the split new template also need to be split, and the samples are respectively corresponding to the new template.

Step S6 specifically includes:

S6.1: for the obtained new template, performing a coverage check with the previously parsed template; coverage among templates means that one log template can be matched to another log template after a regular expression. This situation may lead to a situation where one log message matches two templates; if a template coverage exists, a covered template needs to be deleted, and a corresponding log sample is transferred under the covered template;

S6.2: replacing by common rules ensures that a resulting template conforms to the specification, e.g., replacing a plurality of consecutive spaces with one space, replacing a plurality of consecutive wildcards with one wildcard, etc.

S6.3: storing the new log template processed above in the database.

Compared to the Prior Art, the Present Invention has the Following Advantageous Effects:

1. The method of the present invention can automatically perform template matching on an incoming log and determine whether parsing is required; if parsing is required, a large language model is used to parse and correct the obtained log template; and after correction, whether a template is suitable is determined according to a sample in a database, and template merging and template splitting are performed. Finally, after post-processing, the obtained new log template is stored in the database.

2. In experiments, the present invention showed a stable effect on a number of different log data sets (log data covering distributed systems, supercomputers, operating systems, mobile systems, server applications, standalone applications). Compared with the traditional method, both the log grouping indicator (Group Accuracy) and the parsing accuracy indicator (Parsing Accuracy, Edit Distance) show significant advantages. Also, when compared to a method based on a pre-training model, the present invention has the advantage that pre-training is not required and fine-tuning with labeled samples is not required to achieve good results. Finally, when compared with existing methods based on conversational large language models, this method shows significant advantages in terms of log grouping indicator and parsing accuracy indicator, as well as in terms of time and cost.

3. Experiments show that the log template generated by this method has significant advantages in accuracy, robustness, time and cost.

DESCRIPTION OF THE EMBODIMENTS

The present invention will now be described in further detail with reference to the accompanying drawings and examples, it being noted that the examples described below are intended to facilitate an understanding of the present invention and are not intended to be limiting in any way.

Figure 1:
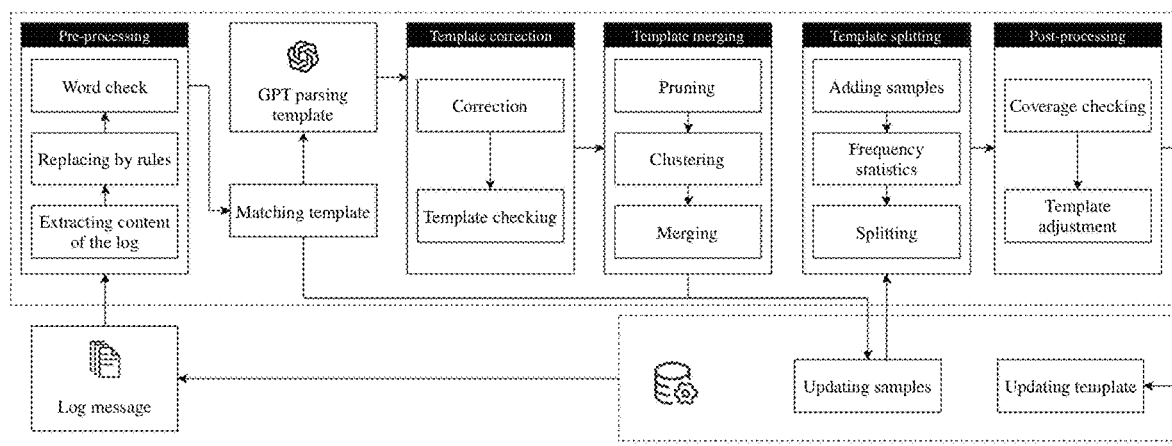
FIG. 1 is an architectural diagram showing online log parsing by the method according to the present invention.
Figure 2:
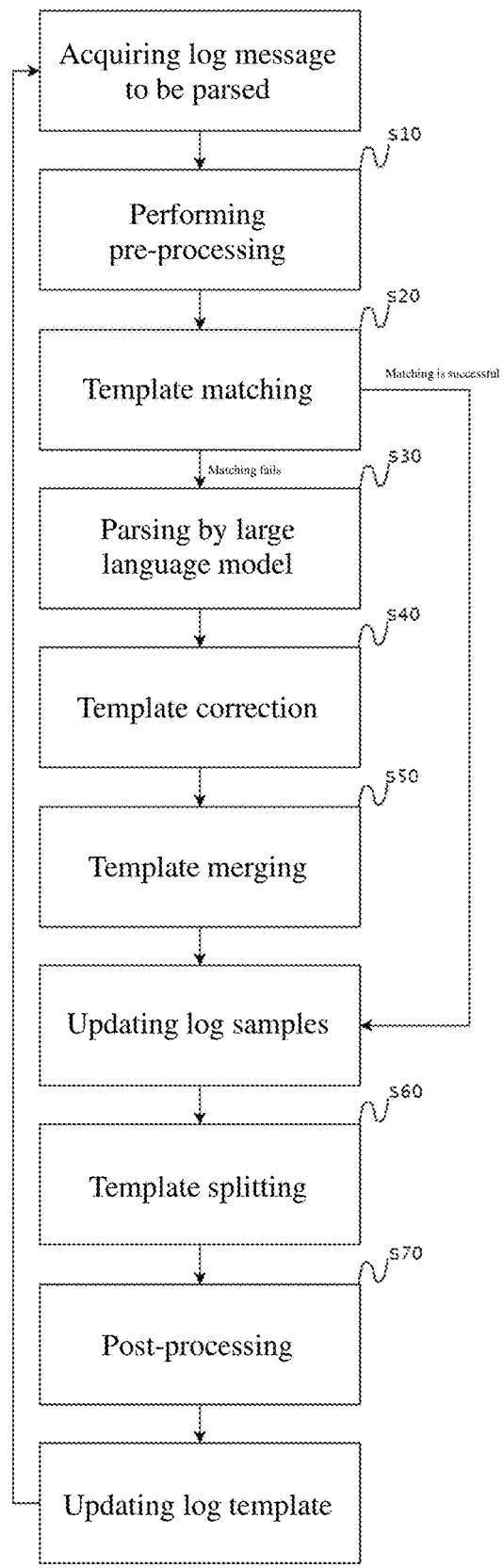
FIG. 2 is a schematic flow diagram showing performing online log parsing according to the present invention.

As shown in FIGS. 1 and 2, a low-cost and zero-shot online log parsing method based on a large language model includes the following steps:

S10: log message to be parsed is pre-processed. Firstly, different rules are used to extract the content of the log for different log sources, and the log header information is removed. The pre-defined rules are then used to pre-process the log to reduce the complexity of log parsing. It is then checked whether the log contains only one word, if the log contains only one word, a post-processing step is directly performed.

S20: all the log templates are extracted from the database, the log templates are converted into regular expressions, and performed regular expression matching with a new incoming log. If the matching is successful, log samples corresponding to the log templates are updated, otherwise a large language model is used to parse a log to generate a new template.

S30: interfaces of different large language models are invoked to conduct a dialogue, a result of parsing the log by the large language model is acquired, and the log template is extracted therefrom.

S40: template correction is performed to ensure that a corresponding log message can be matched after the template is converted into a regular expression.

S50: when a new template is generated, it is determined whether the template can be merged with an existing template, firstly, the distance among templates is calculated, and then those templates which have a distance greater than a certain threshold are removed from the current log template, and the remaining templates are clustered; if a template and a current log template are clustered into one group, log merging is performed; if template merging is performed, log samples need to be updated.

S60: when the log sample is updated, it is determined whether the log template of which the number of log samples exceeds a threshold can be split into multiple templates; the LCS of its sample is calculated, then the occurrence frequency of private partial words except for LCS is analyzed, and if there is a position reaching the threshold, template splitting is performed at this position.

S70: the templates are post-processed; it is determined whether there is a template coverage problem, and some uniform replacing by rules is performed on the generated log template to ensure that the log template complies with the specification; the template is then stored in the database and the next log is then parsed.

Figure 3:
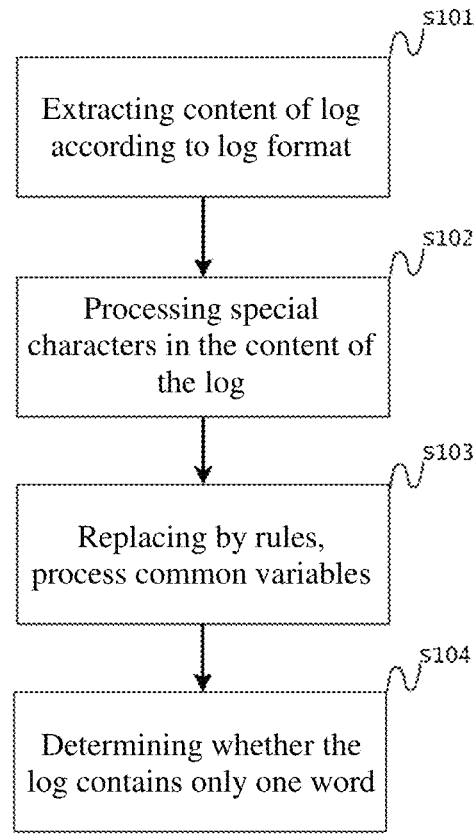
FIG. 3 is a schematic flow diagram showing pre-processing performed in step S10.

As shown in FIG. 3, the S10 is specifically implemented as:
- S101: according to the log format, a suitable regular expression is used to extract the content of the log, and the log header information (such as date, time, log level, thread id, etc.) is deleted;
- S102: a special character in the content of the log is processed, taking as an example that a large language model is required to replace a dynamic variable with {{ }}, then the { } in the source log needs to be replaced with
- S103: a regular expression is used to replace a common variable in the log to reduce subsequent parsing difficulty. Common dynamic variables are: IP address, website, etc.;
- S104: it is determined whether the log contains only one word, and if it contains only one word, a parsing step using a large language model is skipped, and this word is directly used as a log template.

Figure 4:
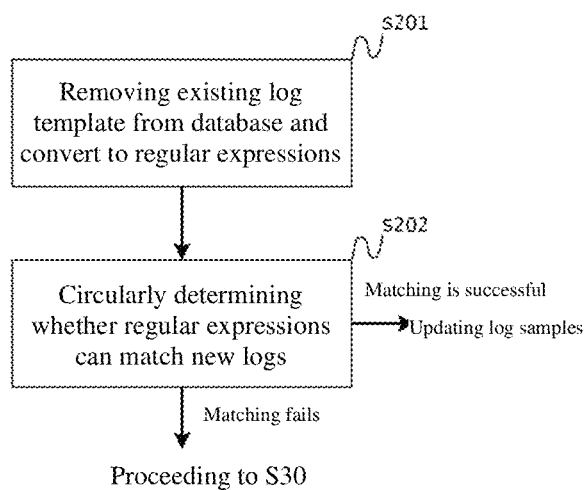
FIG. 4 is a schematic flow diagram showing performing template matching in step S20.
Figure 5:
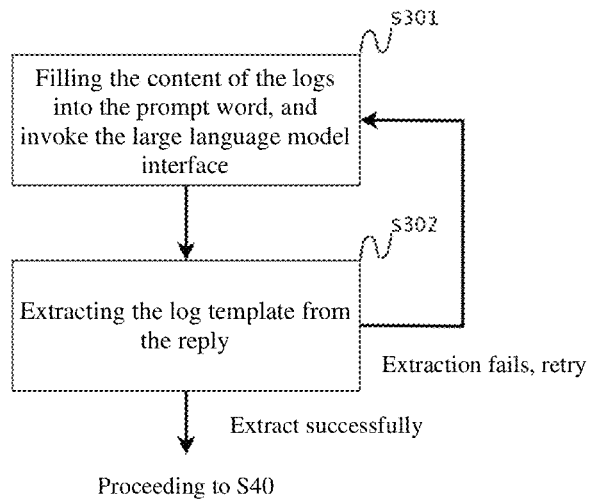
FIG. 5 is a schematic flow diagram showing using large language model parsing in step S30.

As shown in FIG. 4, S20 is specifically implemented as:
- S201: existing templates which have been parsed are extracted out from a database, and are converted into regular expressions (i.e., a dynamic variable is changed into a wildcard);
- S202: it is circularly determined whether the regular expression obtained in S201 can be matched with a new log, if there is a template that can be matched successfully, a log sample is updated, otherwise, S30 is performed, and parsing is performed using a large language model. As shown in FIG. 5, S30 is specifically implemented as:
- S301: the content of the log obtained previously is filled in a prompt word, and then an interface query parsing result of the large language model is invoked. Taking using ChatGPT as an example of a large language model, the prompt word may be "You will be provided with a log message delimited by backticks. You must abstract variables with {{placeholder}} to extract the corresponding template. Print the input log's template delimited by backticks. Log message: 'LOG'". The 'LOG' therein is sufficient to fill in the previously obtained content of the log;
- S302: a log template is extracted from the result according to the result returned by the large language model. Taking the prompt word of S301 as an example, it suffices to extract the part segmented by a separator". If the extraction fails, it is indicated that the results returned by the large language model are problematic, 3 retries are performed. If the log template is still unavailable, the parsing fails and an error is reported.

Figure 6:
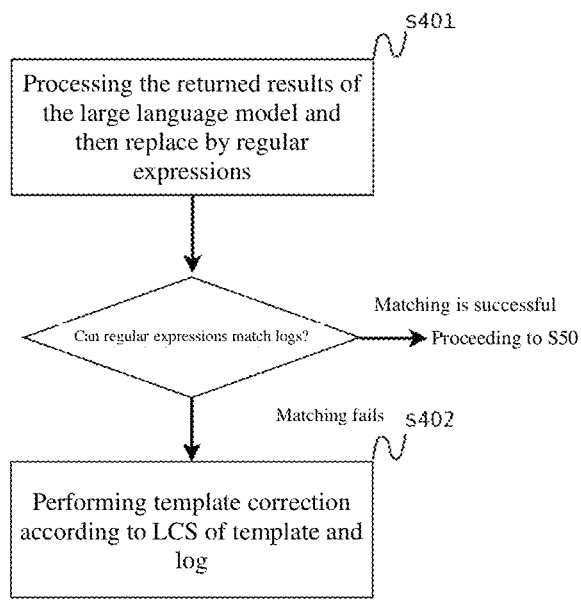
FIG. 6 is a schematic flow diagram showing performing template correction in step S40.

As shown in FIG. 6, S40 is specifically implemented as:
- S401: the log template result directly returned by the large language model is performed format unification, a placeholder of the dynamic variable is replaced with a wildcard and converted into a regular expression, and it is determined whether the current log can be matched; if the regular expression matching is successful, proceeding to S50, and if the regular expression matching fails, S402 is executed;
- S402: repair is performed on the log template which cannot be performed regular expression matching. Firstly, the log and the log template are segmented according to punctuation marks and words, and then the two word lists obtained after segmentation are used to find the longest common part LCS, which is reserved for the LCS; for the non-common part, if it is a wildcard in the log template, the wildcard is used to replace the position, otherwise, the words in the original log are used. After cycling through, the words and punctuation marks are recombined to obtain the repaired log template, which ensures that the original log is capable of performing regular expression matching.

Figure 7:
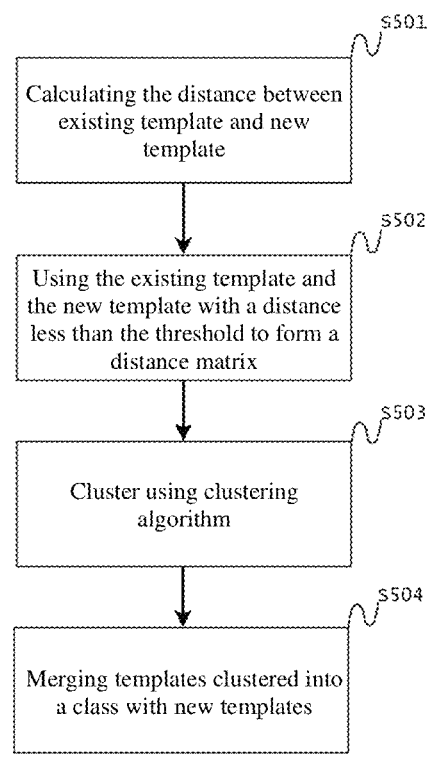
FIG. 7 is a schematic flow diagram showing performing template merging in step S50.

As shown in FIG. 7, S50 is specifically implemented as:
- S501: a distance between an existing template and a new template is calculated, and an edit distance, a LCS weighted distance, etc. can be used;
- S502: the existing template and the new template with a distance less than the threshold are used to form a distance matrix, and the template with a long distance is discarded;
- S503: the distance matrix obtained in S502 is used to perform clustering using a clustering algorithm;
- S504: the clustering result is checked, and if the clustering result shows that the existing template and the new template are in the same class, they are merged. The LCS of this class is extracted and then filled with wildcards for non-null private parts, and the merged template is obtained after splicing.

Figure 8:
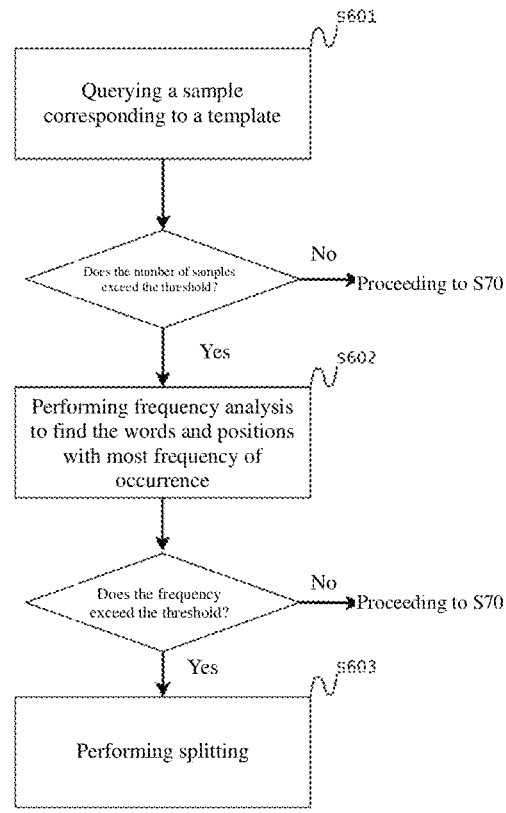
FIG. 8 is a schematic flow diagram showing performing template splitting in step S60.

As shown in FIG. 8, S60 is specifically implemented as:
- S601: it is determined whether the number of samples corresponding to the current log template exceeds a threshold. If the threshold is exceeded, then proceeding to S602, otherwise proceeding to S70;
- S602: the LCS is extracted from the log sample, frequency analysis is performed on different words appearing in the private part, the words and positions with most frequency of occurrence are found, and it is determined whether the word exceeds a frequency threshold. If the threshold is exceeded, then proceeding to S603, otherwise proceeding to S70;
- S603: the position obtained in S602 is performed template splitting, and divided into several different new templates according to several different words appearing at the position. The old template is deleted and the corresponding log sample is classified to the new template according to the word category at that position.

Figure 9:
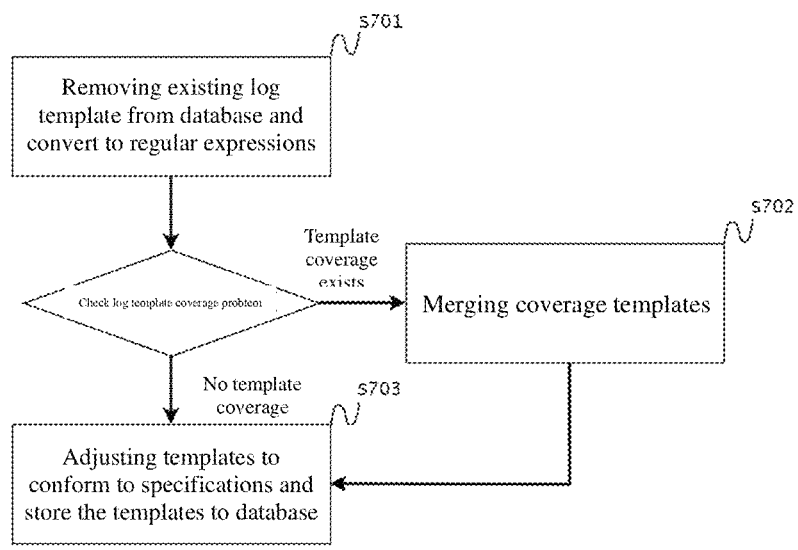
FIG. 9 is a schematic flow diagram showing performing post-processing in step S70.

As shown in FIG. 9, S70 is specifically implemented as:
- S701: the existing log template is taken out from the database, converted into a regular expression, and coverage problems of the existing template and the new template are checked. The problem of template coverage is that one log template is capable of performing regular expression matching with another. If there is template coverage, proceeding to S702, otherwise proceeding directly to S703;

S702: the covered log template is deleted from the template database, and a log sample corresponding thereto is transferred to a log template which can cover same;

S703: replacing by common rules ensures that the resulting template conforms to the specification, e.g., replacing a plurality of consecutive spaces with one space, replacing a plurality of consecutive wildcards with one wildcard, etc. The new log template is then stored in the database.

According to the foregoing embodiments of a low-cost and zero-shot online log parsing method based on a large language model, the present invention also provides a low-cost and zero-shot online log parsing apparatus based on a conversational large language model, which includes a memory and one or more processors, the memory having stored therein executable code for implementing the online log parsing method in the foregoing embodiments when the processors execute the executable code.

Embodiments of the low-cost and zero-shot online log parsing method based on a large language model of the present invention may be applied to any device capable of data processing, which may be a device or apparatus such as a computer. Apparatus embodiments may be implemented in software, hardware, or a combination of hardware and software.

The implementation process of the functions and roles of each unit in the above-mentioned apparatus is detailed in the implementation process of the corresponding steps in the above-mentioned method, and will not be described in detail here.

With respect to the apparatus embodiments, which substantially correspond to the method embodiments, reference is made to the part of the description of the method embodiments that follows. The above-described embodiments of the apparatus are merely illustrative, and the units described as separate parts may or may not be physically separate, and parts displayed as units may or may not be physical units, may be in one position, or may be distributed on multiple network units. Some or all the modules may be selected according to actual needs to achieve the objectives of the solution of the present invention. A person skilled in the art would have been able to understand and implement same without involving any inventive effort.

Embodiments of the present invention also provide a computer-readable storage medium having stored thereon a program that, when executed by a processor, implements the online log parsing method in the above embodiments.

The computer readable storage medium may be an internal storage unit, such as a hard disk or memory, of any of the device capable of data processing described in any of the preceding embodiments. The computer readable storage medium may also be an external storage device of any device capable of data processing, such as a plug-in hard disk, Smart Media Card, SMC, SD card, Flash Card, etc. provided on the device. Further, the computer-readable storage medium can include both an internal storage unit and an external storage device of any device capable of processing data. The computer readable storage medium is used to store computer programs and other programs and data required by any of the described device capable of data processing, and may also be used to temporarily store data that has been or will be output.

While the foregoing is directed to embodiments of the present invention, other and further embodiments of the present invention may be devised without departing from the basic scope thereof, and the scope thereof is determined by the claims that follow.

What is claimed is:

1. A computer-implemented low-cost and zero-shot online log parsing method based on a large language model stored in a non-transitory computer-readable medium, comprising the following steps:

(S10) firstly, using different regular expressions to extract content of a log for different log sources, then, using a pre-defined rule to replace variables in the content of the log with wildcards, and finally, detecting whether the log contains only one word, and when the log contains only one word, directly adding the word to a log template database without parsing by the large language model;

(S20-S30) firstly, querying the log template database, converting parsed log templates into regular expressions, and performing regular expression matching with new incoming logs; and when the matching is successful, updating log samples corresponding to the log templates, otherwise invoking the large language model to parse the log to generate a new template, wherein the method for invoking the large language model to parse the log to generate a new template is implemented by: filling the content of the log obtained previously into a prompt word, and then invoking interfaces of different large language models to conduct a dialogue to acquire a result of parsing the log by the large language model, and extracting a log template therefrom;

(S40) for the log template obtained by invoking the interfaces of the large language models, firstly determining whether the template is capable of performing regular expression matching with an original log, and when the template is incapable of performing regular expression matching with the original log, performing correction;

(S50) when a new template is generated, finding similar templates through clustering, and when similarity exceeds a set threshold, merging the templates;

(S60) performing frequency analysis on a sample of the log template, and when an occurrence frequency of words at certain positions exceeds a threshold, as a constant part of the template, splitting the template based on the words; and (S70) after the template is obtained, performing post-processing to ensure that the obtained template conforms to the specification, and then storing the template in the database.

2. The computer-implemented low-cost and zero-shot online log parsing method based on a large language model stored in a non-transitory computer-readable medium according to claim 1, wherein the step (S10) S1 specifically comprises the following sub-steps:

(S101): determining a corresponding log format according to a selected log source, selecting a corresponding regular expression to extract content of the log, and ignoring a log header;

(S102): replacing special characters in the content of the log;

(S103): replacing the content of the log by rules, and using a pre-defined regular expression to replace variables commonly appearing in different log sources; and (S104): checking the content of the log, and when the processed log template replaced by rules has only one word, using the word as a log template.

3. The computer-implemented low-cost and zero-shot online log parsing method based on a large language model stored in a non-transitory computer-readable medium according to claim 2, wherein in the sub-step (S101), the log header contains date, time, log level, and thread id.

4. The computer-implemented low-cost and zero-shot online log parsing method based on a large language model stored in a non-transitory computer-readable medium according to claim 1, wherein the step (S20-S30) specifically comprises the following sub-steps:
  (S201): converting the templates into regular expressions from the log template database storing log templates, then performing matching using the regular expressions to check whether a new incoming log is capable of being matched with a certain log template, when the new incoming log is capable of being matched with the certain log template, updating a log sample, and when the new incoming log is incapable of being matched with the certain log template, proceeding to sub-step (S202) to perform log parsing; and
  (S202): invoking an API of a conversational large language model, putting the content of the log into the prompt word to put questions to the large language model, and acquiring a log template according to a content of an answer.

5. The computer-implemented low-cost and zero-shot online log parsing method based on a large language model stored in a non-transitory computer-readable medium according to claim 1, wherein the step (S40) specifically comprises the following sub-steps:
  (S401): unifying formats of log template results directly returned by the large language model;
  obtaining a specified log template, converting the log template into a regular expression, and performing regular expression matching with the log; when the regular expression Matching is successful, directly executing (S50), and when the regular expression matching fails, executing (S402) to correct the template; and
  (S402): correcting log templates which are not capable of being subjected to regular expression matching, wherein firstly, both the log and the log template are segmented according to punctuation marks and words; for the two segmented word lists, a common part is found and reserved; for a non-common part, when a wildcard is present in the log template, the word at the position is replaced with the wildcard, otherwise, the word in the original log is used; and recombining the words and the marks after cycling through to obtain a corrected log template.

6. The computer-implemented low-cost and zero-shot online log parsing method based on a large language model stored in a non-transitory computer-readable medium according to claim 1, wherein the step (S50) specifically comprises the following sub-steps:
  (S501-S502-S503) firstly, calculating a distance between a new template and an existing template in the log template database; setting a distance threshold dist, wherein all existing templates with a distance greater than the dist from the new template do not participate in clustering; when the distance between the new template and all the existing templates is greater than the dist, directly adding the new template to the log template database without clustering, otherwise performing a clustering step; and
  before clustering, calculating a distance matrix among the templates, and then performing template merging on the templates which are clustered into the same class with the new template; and
  (S504): firstly, extracting a longest common subsequence (LCS) clustered into the same class of template groups, wherein the LCS is a common part among templates, and is reserved in a merged template; and the part segmented by the LCS is a private part of each of the templates, and for the private part, what is not null is directly replaced with a wildcard to obtain a new merged template.

7. The computer-implemented low-cost and zero-shot online log parsing method based on a large language model stored in a non-transitory computer-readable medium according to claim 1, wherein the step (S60) specifically comprises the following sub-steps:
  (S601) parsing, by the large language model, the log to obtain a new log template, sampling a log message as a sample by default, storing the log message in a log sample database, and storing the log template in the log template database; when a subsequent incoming new log performs successful regular expression matching with the log template in the database, it is necessary to determine whether to sample the log; after a log template is sampled, it is necessary to determine whether a log sample corresponding to the log template reaches a dynamic threshold N; when the threshold N is not exceeded, directly storing the log message in the log sample database; when the threshold N is exceeded, performing frequency analysis;
  when a result of template splitting is a single template, the threshold N is increased; when the template splitting is successful, an original template is deleted, and initial threshold setting of the new template is determined according to the number of log samples matched with the template;
  (S602) firstly, finding a longest common subsequence (LCS) of the sampled log samples as a common part, wherein the part segmented by the common part is a private part of each log sample; counting the number of different substrings of each private part for the private part, wherein a higher frequency of the substrings in the private part indicates that the substrings may be a static variable; conversely, a lower frequency means a dynamic variable; and
  establishing a threshold freq to determine whether the substrings are a static variable or a dynamic variable for all private parts; comparing the highest frequency of different substrings in the private part each time, and when the highest frequency is higher than the freq, determining the private part as a static variable, and splitting a template according to different substrings of the private part, wherein the freq is set according to an actual scene; and
  (S603) splitting the template according to the word appearing at the position for position information about the private part obtained in the frequency analysis, wherein except for the position, other parts inherit various parts of the template before splitting; at the same time, log samples corresponding to the split new template also need to be split, and the samples are respectively corresponding to the new template.

8. The computer-implemented low-cost and zero-shot online log parsing method based on a large language model stored in a non-transitory computer-readable medium according to claim 1, wherein the step (S70) specifically comprises the following sub-steps:
  (S701): for the obtained new template, performing a coverage check with the previously parsed template, wherein when a template coverage condition exists, a covered template needs to be deleted, and a corresponding log sample is transferred under the covered template;

(S702): replacing by common rules to ensure that a resulting template conforms to the specifications; and (S703): storing the new log template processed above in the database.

\* \* \* \* \*